US012313844B1

(12) United States Patent
Labadie et al.

(10) Patent No.: US 12,313,844 B1
(45) Date of Patent: May 27, 2025

(54) SENSOR COVER WITH DRAIN

(71) Applicant: Zoox, Inc., Foster City, CA (US)

(72) Inventors: Christopher William Labadie, San Francisco, CA (US); Rajith Jayaratne, Castro Valley, CA (US); Mohammad Umar Piracha, Union City, CA (US)

(73) Assignee: Zoox, Inc., Foster City, CA (US)

( * ) Notice: Subject to any disclaimer, the term of this patent is extended or adjusted under 35 U.S.C. 154(b) by 603 days.

(21) Appl. No.: 17/710,763

(22) Filed: Mar. 31, 2022

(51) Int. Cl.
*G02B 5/12* (2006.01)
*G01S 17/931* (2020.01)
*G02B 27/00* (2006.01)
*B60S 1/60* (2006.01)

(52) U.S. Cl.
CPC ........ *G02B 27/0006* (2013.01); *G01S 17/931* (2020.01); *B60S 1/603* (2013.01)

(58) Field of Classification Search
CPC .... G02B 27/0006; G01S 17/931; B60S 1/603
See application file for complete search history.

(56) References Cited

U.S. PATENT DOCUMENTS

2019/0331509 A1\* 10/2019 Pizzimenti .............. B60R 11/04
2021/0339710 A1   11/2021 Adams et al.
2022/0043120 A1    2/2022 Baldovino et al.

OTHER PUBLICATIONS

Office Action for U.S. Appl. No. 17/710,722, mailed on Oct. 1, 2024, Labadie, "Sensor Cover With Trough", 9 pages.

\* cited by examiner

*Primary Examiner* — Euncha P Cherry
(74) *Attorney, Agent, or Firm* — Lee & Hayes, P.C.

(57) ABSTRACT

Techniques for protecting a sensor from an obstruction such as liquid are discussed herein. For instance, a sensor cover assembly can include a cover to protect a sensor from precipitation, contaminants, or other obstructions. The cover of the sensor cover assembly can be configured to direct an obstruction (e.g., a liquid) away from a lens of the sensor (e.g., a ring lens of a lidar sensor) to reduce obstructions to a field of view of the sensor. The cover can include one or more channels (e.g., a trough, a downspout, a gutter, etc.) or shapes (e.g., a curved surface, a sloped surface, a convex surface, etc.) to divert the obstruction away from the lens of the sensor.

20 Claims, 7 Drawing Sheets

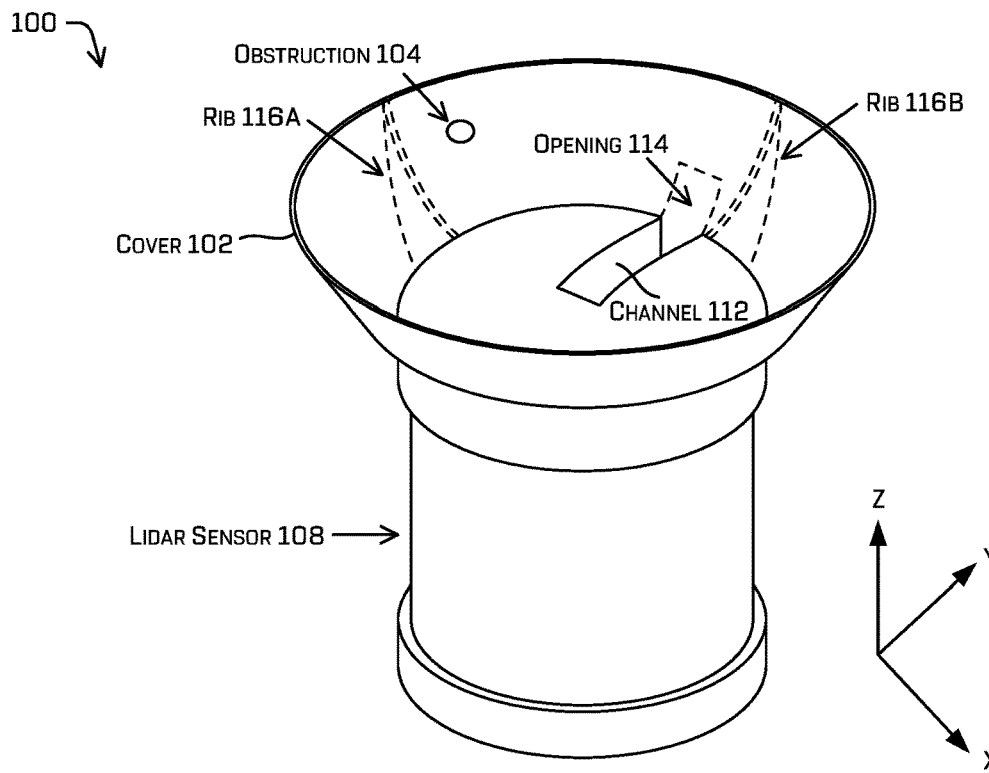
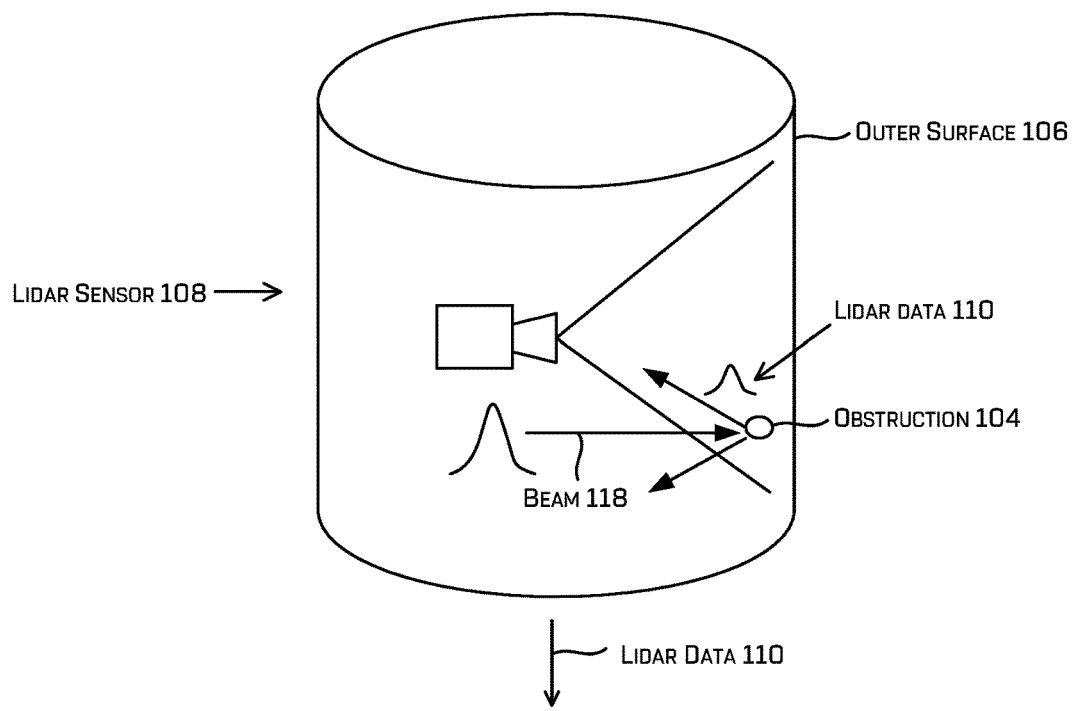
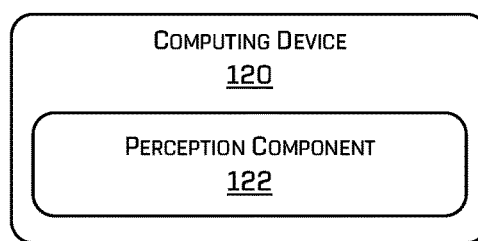
FIG. 1A

SENSOR COVER WITH DRAIN

BACKGROUND

Accurate determinations of object characteristics can assist, for example, an autonomous vehicle to traverse the environment. However, the quality of the data collected by sensors may become degraded in certain circumstances, including based on environmental factors such as weather, traffic, or road conditions, etc. In such cases, the data collected by the sensors may be suboptimal or even unsuitable for use, potentially impacting vehicle navigation, obstacle detection and avoidance, and other functions that rely on the sensor data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1A is an illustration of an example sensor cover assembly to protect an example sensor from an obstruction.

DESCRIPTION

Figure 1B:
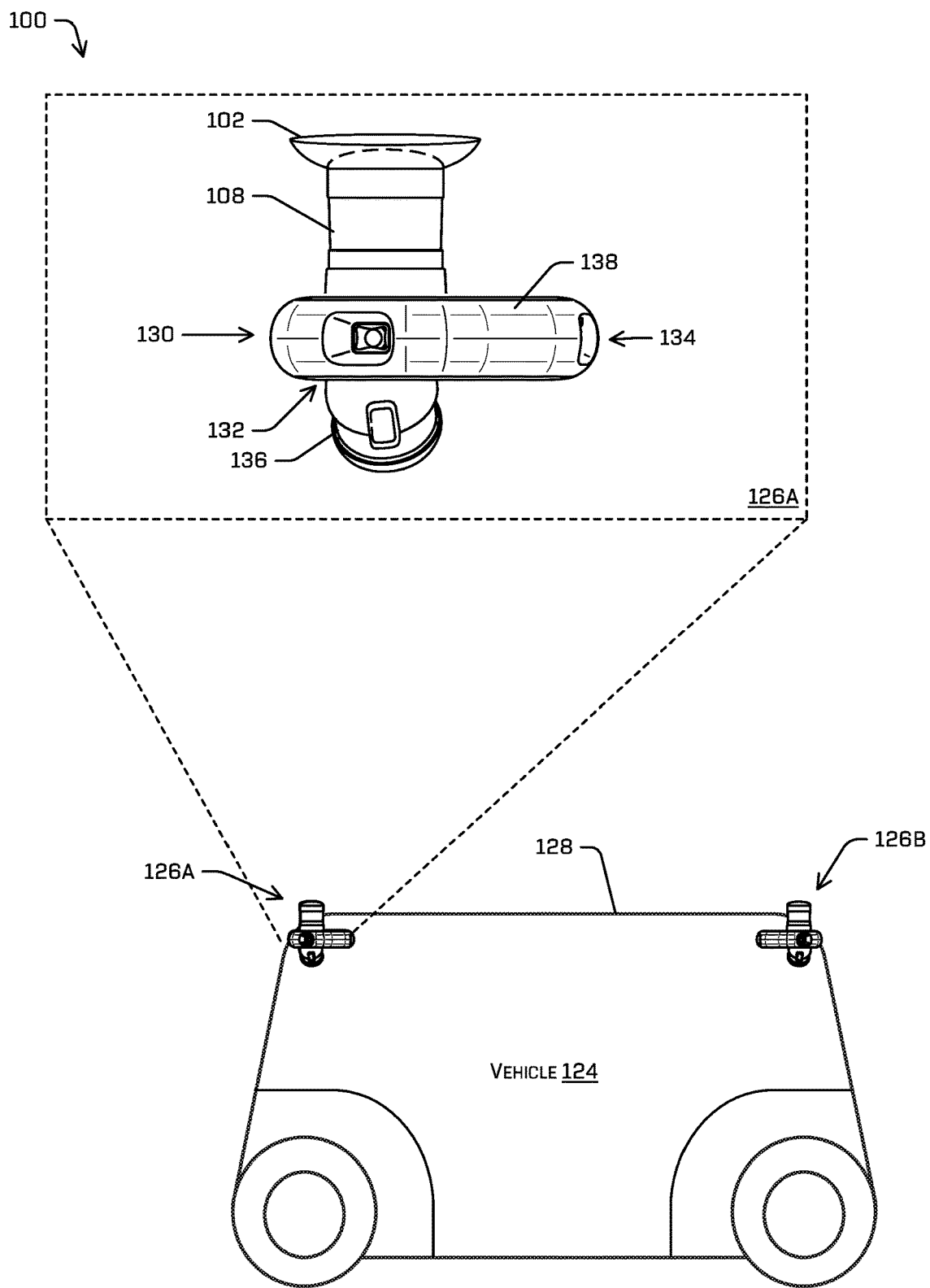
FIG. 1B is an illustration of an example vehicle having one or more sensor pod assemblies configured with multiple sensors to collect information about the surroundings of the autonomous vehicle, in accordance with examples of the disclosure.

Techniques for protecting a sensor from an obstruction are discussed herein. For instance, a sensor cover assembly can include a cover to protect a sensor from precipitation (e.g., rain, snow, sleet, etc.), contaminants (e.g., mud, dirt, bird droppings, etc.), or other obstruction(s). Generally, the cover of the sensor cover assembly can be configured to shield liquid from contacting an outer surface (e.g., a lens, window, etc.), direct the liquid away from the outer surface, and/or direct the liquid to a particular portion of the outer surface to reduce obstructing a field of view of the sensor. In some examples, the sensor can be a rotating lidar sensor and the outer surface can be a ring lens of the rotating lidar sensor. In some examples, the cover can include one or more open channels (e.g., troughs, gutters, grooves, depressions, etc.) and/or enclosed channels (e.g., pipes, downspouts, conduits, passages, etc.) or shapes (e.g., a curved surface, a sloped surface, a convex surface, etc.) to divert precipitation or other obstructions away from a ring lens or housing of the lidar sensor and/or to divert precipitation or other obstructions to a particular or limited portion of the ring lens or housing of the lidar sensor. For instance, in some examples, the cover may be configured to divert precipitation or other obstructions to a portion of the ring lens associated with a field of view of the lidar sensor that is otherwise obstructed such as by a body of a vehicle or robot to which the lidar sensor is mounted. The sensor cover assembly can in some examples also include a heater and/or sensor cleaning assembly to keep an area of the lidar sensor free of water, ice, or other debris. By implementing the sensor cover assembly as described herein, obstructions on a sensor can be reduced thereby improving accuracy of data captured by the sensor.

Using the techniques described herein, an obstruction representing rain, dirt, dust, snow, ice, animal droppings, etc. can be diverted away from a first field of view of a lidar sensor to a second field of view. For example, the lidar sensor can operate on an autonomous vehicle traversing an environment, and obstructions can be diverted away from the first field of view directed outward from the autonomous vehicle to a second field of view that may be directed towards the autonomous vehicle wherein data from the second field of view may be less important for autonomous operation of the vehicle. In such examples, lidar data from the lidar sensor (along with other sensor data) can be used to control the autonomous vehicle (e.g., determine a vehicle trajectory to avoid an object in the environment, etc.). By implementing the techniques described herein, safety of the autonomous vehicle can be improved by reducing an impact of an obstruction on an outer surface of a lidar sensor used for sensing an environment.

In some examples, the cover can be coupled to a housing of the lidar sensor having a top surface and a side surface. For instance, the cover can be coupled to the top surface of the housing and extend to at least a portion of the side surface of the housing. A top surface (or other surface) of the cover can be sloped, curved, and the like to direct a liquid from a first portion of the cover to another portion of the cover. In some examples, the top surface of the cover can include a channel to capture liquid from the sloped and/or curved surface and to divert the liquid to an opening that directs the liquid away from a particular field of view of the lidar sensor. In some examples, the channel (e.g., a first channel) can represent a trough that gathers liquid from the top surface of the cover and directs the liquid toward a perimeter of the cover. In various examples, the cover can also include a second channel (e.g., a gutter) around a perimeter of the cover that directs liquid from the top surface of the cover to the first channel (e.g., the trough) and/or to the opening at the perimeter of the cover.

The channel (e.g., the trough) can extend from the top surface of the cover to a side surface of the cover that covers a portion of the side surface of the housing. In other words, a single channel can begin in a region of the top surface of the cover and extend along the side surface of the cover to an opening. In some examples, the channel can instead extend to an opening on or near the top surface of the cover, and the sensor cover assembly can further include an at least partially enclosed tube (e.g., a downspout) to direct the liquid from the opening to an area away from the lidar sensor. In some examples, the at least partially enclosed tube can expel the liquid into a liquid containment unit to store the liquid for use in a cleaning operation (e.g., mechanically removing an obstruction using the stored liquid).

Techniques to direct liquid away from the lidar sensor can also or instead include configuring the cover to move (e.g. rotate, change orientation, etc.) based at least in part on a characteristics of the environment or a characteristic of a robotic device (e.g., an autonomous vehicle) on which a lidar sensor is attached. For example, the sensor cover assembly can include a manipulator that represent a passive manipulator or an active manipulator. The sensor cover assembly can include, for example, a passive manipulator (e.g., a vane, fin, foil, blade, etc.) that causes the cover to rotate or change orientation relative to a coordinate system based at least in part on wind speed or motion of the robotic device (e.g., vehicle motion). The sensor cover assembly can also or instead include an active manipulator (e.g., a motor, servo, etc.) to control a position and/or orientation of the cover based on weather (e.g., a wind direction, a position of the sun, ambient light in the environment, a direction of travel of the robotic device, etc.). The active manipulator can, for instance, determine a slope of the top surface of the cover based at least in part on at least one of: a wind speed, an amount of the liquid, a direction of arrival of the liquid, and/or a direction of travel of an autonomous vehicle coupled to the lidar sensor. By using the passive manipulator and/or the active manipulator, the sensor cover assembly can move the cover to ensure that the channel aligns with a field of view that is least likely to impact lidar data captured by the lidar sensor (e.g., the channel can direct rainwater towards a field of view that includes a surface of the autonomous vehicle such as a roof). Further description of movement by the cover to improve how an obstruction is prevented from reaching a surface of the lidar sensor can be found in relation to FIG. 1A-5, and elsewhere.

In some examples, the sensor cover assembly can include a drain that directs an obstruction towards an interior portion of a sensor housing. For example, a cover can include a drain located at a radial center of the sensor to relocate the obstruction from the cover and away from a side surface of the sensor. In some examples, the drain can be located in an interior portion of the sensor housing and optionally extend towards a bottom surface of the sensor housing. The drain can, generally, represent a hollow tube with a first end at the cover and a second end at an exterior edge of the sensor housing.

In some examples, the drain may be, or may pass through, a hollow central shaft of a rotatable lidar sensor. For example, the cover can divert the obstruction to the drain which then transmits the obstruction through a central shaft of the sensor to a drain outlet. In various examples, the central shaft may be disposed at and/or aligned with an axis of rotation center of a housing of the sensor. The central shaft may be rotatable with the rotatable elements (e.g., emitters, sensors, etc.) mounted thereto, or the central shaft may be stationary and the rotatable elements may spin around the central shaft.

In some examples, the drain outlet can, be fixed to the housing of the lidar sensor and be configured to direct the obstruction at any angle relative to a body of a vehicle (e.g., toward it, away from it, etc.). In some examples, the drain outlet can rotate (e.g., passively or actively by a manipulator) to direct the obstruction toward a specific direction and/or area, such as toward a trailing end of the vehicle.

In some examples, the sensor may be a lidar sensor and the drain may extend through a hollow central shaft of a rotatable lidar sensor. For example, the cover can divert an obstruction to a drain that transmits the obstruction through a central shaft of the rotatable lidar sensor to an outlet. The central shaft can represent a hollow tube that enables the obstruction to move from the cover to the outlet. In various examples, the central shaft may be disposed at and/or aligned with an axis of rotation center of a housing of the lidar sensor. The outlet can, in some examples, be fixed to the housing of the lidar sensor and be configured to direct the obstruction at any angle relative to a body of a vehicle (or other robotic device on which the lidar sensor is coupled). In some examples, the outlet can rotate (e.g., passively or actively by a manipulator) to direct the obstruction toward a specific direction and/or area, such as toward a trailing end of the vehicle.

In some examples, the sensor cover assembly can be included in a vehicle, such as an autonomous vehicle that is bi-directional (a front region can change depending upon a direction of travel). By way of example and not limitation, the autonomous vehicle can include one or more lidar sensors at fixed positions that may correspond to the front region or a rear region of the autonomous vehicle depending upon a direction of travel of the autonomous vehicle. Using the techniques described herein, a cover can rotate and/or change orientation to reduce an obstruction on a lens of the lidar sensor based at least in part on the lidar sensor is in the front region or the rear region. That is, the passive manipulator and/or the active manipulator of the sensor cover assembly can cause a channel of the cover to change position (change angle relative to a ground surface, rotate, etc.) to direct the obstruction to a region that is less impacted relative to the other region (e.g., a region towards a center of the vehicle rather than a region away from the center of the vehicle). In other words, the cover can adapt to a direction of travel for the autonomous vehicle, a wind speed, a direction of the rain, etc. to minimize an impact of the obstruction on the lidar sensor.

In examples when the lidar sensor is coupled to a robotic device that traverses an environment at varying speeds, the cover (or other components or manipulator(s), or elements of the sensor cover assembly) can include a shape that improves aerodynamics at the varying speeds. For instance, the cover can be configured to include a shape that reduces wind resistance relative to another shape. The shape of the cover can also be configured to direct airflow onto a surface of the lidar sensor (e.g., a side surface from which beams are emitted). For instance, an edge or other portion of the cover can include a geometry that causes air to remove and/or prevent an obstruction from adhering to the lidar sensor.

The sensor cover assembly can also or instead include a crumple zone (e.g., an area designed to deform to reduce impact by an object on the lidar sensor). For instance, the cover can be configured to plastically deform, crumple, break away or otherwise become decoupled from the housing of the lidar sensor to reduce a force caused by the object contacting the cover. In one specific example, in the event that a pedestrian comes into contact with the cover of the lidar sensor, a force of impact to the pedestrian and/or the lidar sensor can be reduced based at least in part on the crumple zone (relative to not implementing the crumple zone). Additionally, or alternatively, the sensor cover assembly can include a mounting mechanism such as an adhesive, sheer bolt, etc. that limits magnitude of an impact between the lidar sensor (or other sensor) and an object. For example, the mounting mechanism can couple one or more components (e.g., the cover, the downspout, etc.) of the sensor cover assembly to a vehicle to enable a component to at least partially "break away" from the vehicle upon application of a threshold force, such that the force applied to an object (e.g., a pedestrian) is limited to the threshold force to minimize injury or damage to the object.

In some examples, the sensor cover assembly can include one or more heating elements on or in a vicinity of the cover and/or the downspout to mitigate affects of colder temperatures. For example, the one or more heating elements can cause snow, sleet, freezing rain, and the like, to change to a liquid which can then be directed to a field of view least likely to impact sensor data captured by the sensor.

In some examples, the cover can be configured to create a space between the cover and the sensor to help reduce solar heat. In effect, the cover shades the housing of the lidar sensor and reduces temperatures within the lidar sensor housing. For example, the cover can be coupled to a sensor and spaced a distance (e.g., 10-100 millimeters) above a top surface of the sensor (or sensor housing). In that case, the space between the cover and the sensor housing may comprise an air gap or may comprise an insulative material. In some examples, a bottom surface of the cover comprises a thermally insulating material to further reduce solar energy imparted to the lidar sensor housing. By configuring the cover to include the area as described herein, affects of heat on operation of the sensor can be mitigated.

In some examples, the sensor cover assembly (e.g., cover, channel(s), heater(s), passive manipulator, active manipulator, etc.) can be included in or on a sensor pod (e.g., an enclosure) having two or more sensors (e.g., a lidar sensor, a camera, a radar sensor, etc.). For instance, multiple sensor pods can be associated with an autonomous vehicle to detect an environment. In examples, a cover and a channel representing a downspout can be integrated into the sensor pod to minimize an amount that liquid or other obstructions affect a lidar or other sensor in the sensor pod. For instance, the cover can include a shape to direct airflow away from a ring lens of the lidar sensor while the channel can receive the liquid from the cover and direct the liquid past a side surface of the lidar sensor and through the sensor pod to an area away from the lidar sensor. In examples, the sensor pod may contain cameras (e.g., video cameras), lidar sensors, infrared sensors, radar sensors, time-of-flight sensors and/or other types of sensor modalities. The disclosed cover can be used to divert precipitation and other contaminants from any one or multiple sensors of a sensor pod and/or serve as a solar heat shield.

Though discussed in relation to a lidar sensor in some examples, the sensor cover assembly can protect any type of sensor from an obstruction such as rain, dust, snow, etc. In other words, a cover, channel, and so on, can be configured to protect different types of sensors including a location sensor, a lidar sensor, a radar sensor, a camera, an inertial sensor, an environmental sensor, an audio sensor, and/or a time-of-flight sensor, just to name a few.

The techniques can include the sensor cover assembly reducing an amount of backscattering associated with obstructions on a surface of the lidar sensor. For example, an obstruction(s) (e.g., rain) that would otherwise affect operation of the lidar sensor can be directed away from a surface of the lidar sensor (e.g., a side surface of a housing, a ring lens, etc.) thereby mitigating backscattering caused by the obstruction(s).

The sensor protection techniques described herein can improve functioning of a lidar sensor by directing rain and other debris away from a portion of the lidar sensor. For example, a cover coupled to the lidar sensor can capture water and direct the water to a trough or channel that moves the water away from a side of the lidar sensor that emits beams. The cover can include a shape and/or orientation that prevents water from obscuring a surface of the lidar sensor (e.g., a side of a housing covering the lidar sensor). In some examples, air caused by a shape of the cover can be directed onto the surface to prevent water from adhering to the lidar sensor while also or instead capturing water on a top of the cover. By configuring the cover as described herein, deter-minations that depend upon lidar data captured by the lidar sensor can be improved. In examples when the lidar sensor is associated with an autonomous vehicle, lidar data from the lidar sensor can enable subsequent processes by a vehicle computing device that receives the lidar data to be performed more accurately, require less processing power, and/or require less memory (e.g., classification, tracking, prediction, route planning, trajectory generation, and the like are improved due to fewer obstructions on the lidar sensor). In some instances, the sensor cover assembly described herein can cause more accurate lidar data to be used in generating a trajectory of the autonomous vehicle, which can improve safety for occupants of an autonomous vehicle.

FIG. 1A is an illustration of an example sensor cover assembly 100 to protect an example sensor from an obstruction. For instance, the sensor cover assembly 100 can include a cover 102 configured to direct or divert an obstruction 104 away from an outer surface 106 of a lidar sensor 108. By way of example and not limitation, the obstruction 104 can be a liquid (e.g., rain or other weather event) and a shape and/or an orientation of the cover 102 can be configured to direct the liquid away from the outer surface 106 (e.g., a side surface) to improve accuracy of lidar data 110 captured by the lidar sensor 108 (relative to not implementing the cover 102). However, in other examples, the obstruction may be other types of precipitation (e.g., snow, sleet, hail, etc.), contaminants (e.g., dust, dirt, mud, bird droppings, etc.), or other obstructions. Further, in some examples, the cover 102 may additionally or alternatively shade the sensor to reduce heat from solar radiation, reduce glare, etc.

As shown in FIG. 1A, the cover 102 can include a channel 112 (e.g., a trough, etc.) to collect and divert the obstruction 104 to an opening 114 in the cover that expels the obstruction 104 towards a position of the lidar sensor that is least likely to be used to detect an object in an environment of the lidar sensor 108. For example, the lidar sensor 108 can be coupled to an autonomous vehicle navigating in the environment, and the opening 114 can be located in a field of view that faces at least partially toward the autonomous vehicle. In some examples, the opening 114 can divert the obstruction 104 from the channel 112 to another channel (e.g., a tube, a pipe, etc.) that expels the obstruction 104 beyond the outer surface 106. In other examples, the channel 112 can extend down a side of the lidar sensor 108. Additional description of possible configurations of the cover 102 are discussed throughout this disclosure.

In some examples, the cover 102 can include a variety of shapes to collect, direct, divert, or otherwise cause a liquid to move from a first position to a second position. The cover 102 can include, for example, a convex surface, a concave surface, a sloped surface, or a combination thereof to collect or otherwise relocate the liquid. For example, the first portion of the cover 102 can represent a negative slope from a rim or perimeter of the cover 102 to the second portion having the channel 112. The cover 102 can also or instead include a convex surface corresponding to a shape of a top surface of the lidar sensor 108. In some examples, the channel 112 can be included in the convex surface as shown in the example of FIG. 1A. In various examples, another channel (not shown) can be disposed in a circumference of the cover 102 to direct the liquid toward the channel 112. For instance, a gutter can extend from an end opposite the opening 114 to the channel 112 and can include a slope to direct the liquid gathered from the top of the cover 102 toward the channel 112. In one specific example, the e.g., the circumference of the gutter can be approximately equal to a circumference of the tope surface of the lidar sensor 108.

In some examples, the cover 102 can be circular and include a brim around the circumference of the cover. In various examples, the brim can extend beyond a side surface of a housing of the lidar sensor 108. The brim can, for example, be concave up (e.g., have a concave shape that curves upward at an edge).

FIG. 1A depicts the cover 102 with an upper portion having a larger perimeter than a perimeter associated with a lower portion (e.g., a portion nearest the lidar sensor 108). However, the shape of the cover 102 can also or instead include the upper portion having a smaller perimeter than the perimeter of the lower portion. For example, the cover 102 can include one or more brims including a brim near a bottom surface of the cover 102 that extends beyond a side surface of a housing of the lidar sensor 108 and/or a brim near a top of the cover 102 as shown in FIG. 1. In various examples, an outside surface of the cover 102 can vary in shape (e.g., have a curved surface, a sloped surface, etc.).

In some examples, the cover 102 may not be circular and/or may have protrusions such that the perimeter is an irregular shape. For example, a portion of the cover 102 may extend further beyond a perimeter of the lidar sensor 108 than another portion of the cover 102 to form a brim that is smaller and/or larger in some areas (e.g., not uniform). For example, the cover 102 can include a shape similar to a brim of a baseball cap.

In various examples, the cover 102 can be removably coupled to the lidar sensor 108 and/or integrated into a housing of the lidar sensor 108. For example, the housing can represent a ring lens or the like that covers an internal portion of the lidar sensor 108. In some examples, the cover 102 can be removably attached to enable the cover 102 to be added to and/or removed from the lidar sensor 108 without altering a position of the lidar sensor 108 (e.g., the cover can be mounted or secured to the lidar sensor without removing the lidar sensor 108). In other examples, the cover 102 can be integrated into the lidar sensor 108 such that replacement of the cover 102 requires removal of the lidar sensor 108. In either example, the cover 102 can be configured to protect at least a top surface and a side surface of the lidar sensor 108 from receiving the obstruction 104. In some examples, the lidar sensor 108 can be included in a sensor assembly (e.g., a sensor pod) that houses an additional sensor(s), and the cover 102 can be integrated into the sensor assembly to protect any of: the lidar sensor and the other sensor(s), from liquid or other debris.

Generally, the cover 102 can be configured to direct a liquid or other obstruction type toward the channel 112 by way of a sloped surface and/or a curved surface. In FIG. 1A, the cover 102 is shown as extending beyond a perimeter of the outer surface 106 to capture rain, or other obstructions that may otherwise fall onto the outer surface 106. as discussed, a slope on the top surface of the cover 102 can direct the liquid to the channel 112, for example. That is, a first region of the cover 102 can gradually slope towards a second region that includes the opening 114 (e.g., the first region can be higher than the second region). In some examples, the channel 112 can slope downwardly from a center of the top surface of the lidar sensor 108 to at least a perimeter of the lidar sensor.

In various examples, the cover 102 can include one or more ribs to provide structural support to the cover 102. For example, in FIG. 1A the cover 102 includes rib 116A and rib 116B, though other numbers of ribs are contemplated. The rib 116A and 116B can vary in size and shape to provide rigidity to the cover 102.

Techniques to direct liquid away from the lidar sensor 108 can also or instead include configuring the cover 102 to move (e.g. rotate, change orientation, etc.) based at least in part on a characteristic(s) of the environment and/or a robotic device (e.g., an autonomous vehicle) associated with the lidar sensor 108. The sensor cover assembly 100 can include, for example, a passive manipulator (not shown) that causes the cover to rotate or change orientation relative to a coordinate system based at least in part on wind speed or motion of the robotic device (e.g., vehicle motion). The passive manipulator can represent a surface or portion of the cover 102 that is configured to cause the lidar sensor 108 to rotate based at least in part on air contacting the surface or portion. The sensor cover assembly 100 can also or instead include an active manipulator (e.g., a motor, etc.) (not shown) to control a position and/or orientation of the cover 102 relative to a housing of the lidar sensor based on characteristic(s) of the environment and/or the robotic device. The manipulator (not shown) can cause a slope of the top surface of the cover to change from a first position to a second position based at least in part on at least one of: a wind speed, an amount of the liquid, a direction of arrival of the liquid, and/or a direction of travel of the robotic device. By implementing the passive manipulator and/or the active manipulator, the sensor cover assembly 100 can move the cover 102 relative to the lidar sensor 108 to ensure that the channel 112 aligns with a field of view that is least likely to impact lidar data captured by the lidar sensor 108. In examples when the lidar sensor 108 is coupled to an autonomous vehicle, the channel 112 can rotate to any of 360 degrees to expel the obstruction 104 (e.g., the liquid) at a desired field of view.

The obstruction 104 can represent a foreign particle such as one or more of: rain, mud, dirt, dust, snow, ice, animal droppings, and so on. In some examples, the cover 102 can be associated with a heater (not shown) to melt ice or other frozen obstructions into a liquid that can be removed from the lidar sensor 108. Though discussed in the context of a lidar sensor, the cover 102 can be configured to protect other sensors including a camera, a radar sensor, or a time-of flight sensor, just to name a few. Further, the cover 102 can be configured to protect one or more sensors housed in a sensor assembly.

The outer surface 106 can represent a lens, housing, cylinder, beam exit point, etc. of the lidar sensor 108. For example, the outer surface 106 can represent a ring lens encompassing a circular region of the lidar sensor 108. In some examples, the lidar sensor 108 can generate a beam 118 for transmission into the environment, and the transmission can be affected by the obstruction 104 (e.g., foreign particle(s) on the lidar sensor) to cause an occlusion, redirection or refraction of the beam, and/or backscattering. By implementing the cover 102 as described herein, an amount of obstruction(s) on the outer surface 106 of the lidar sensor 108 can be reduced thereby reducing or eliminating backscattering caused by the beam 118 being obstructed. In other words, using the techniques described herein, the cover 102 can be implemented to mitigate backscattering (and the problems associated therewith) caused by the obstruction 104. For example, the channel 112 and the opening 114 can direct the obstruction 104 away from the lidar sensor 108 prior to the obstruction 104 adhering to the outer surface 106. Absent the obstruction 104 on the outer surface 106, the lidar data 110 (e.g., point cloud information, beam information, and/or pulse information) detected at various distances from the lidar sensor 108 can represent improved information relative to not implementing the sensor cover assembly 100.

In some examples, the lidar sensor 108 can include a different shape other than the example shown in FIG. 1A. For instance, the lidar sensor may not be circular and the cover 102 can be configured to protect a lidar sensor, or other sensor type, having different shapes and configurations. That is, the lidar sensor 108 may not be configured to detect objects 360 degrees around the sensor such as a rotating lidar sensor that relies on techniques other than spinning techniques such as a standing lidar with a flat outer surface (e.g., flash lidar).

Figure 5:
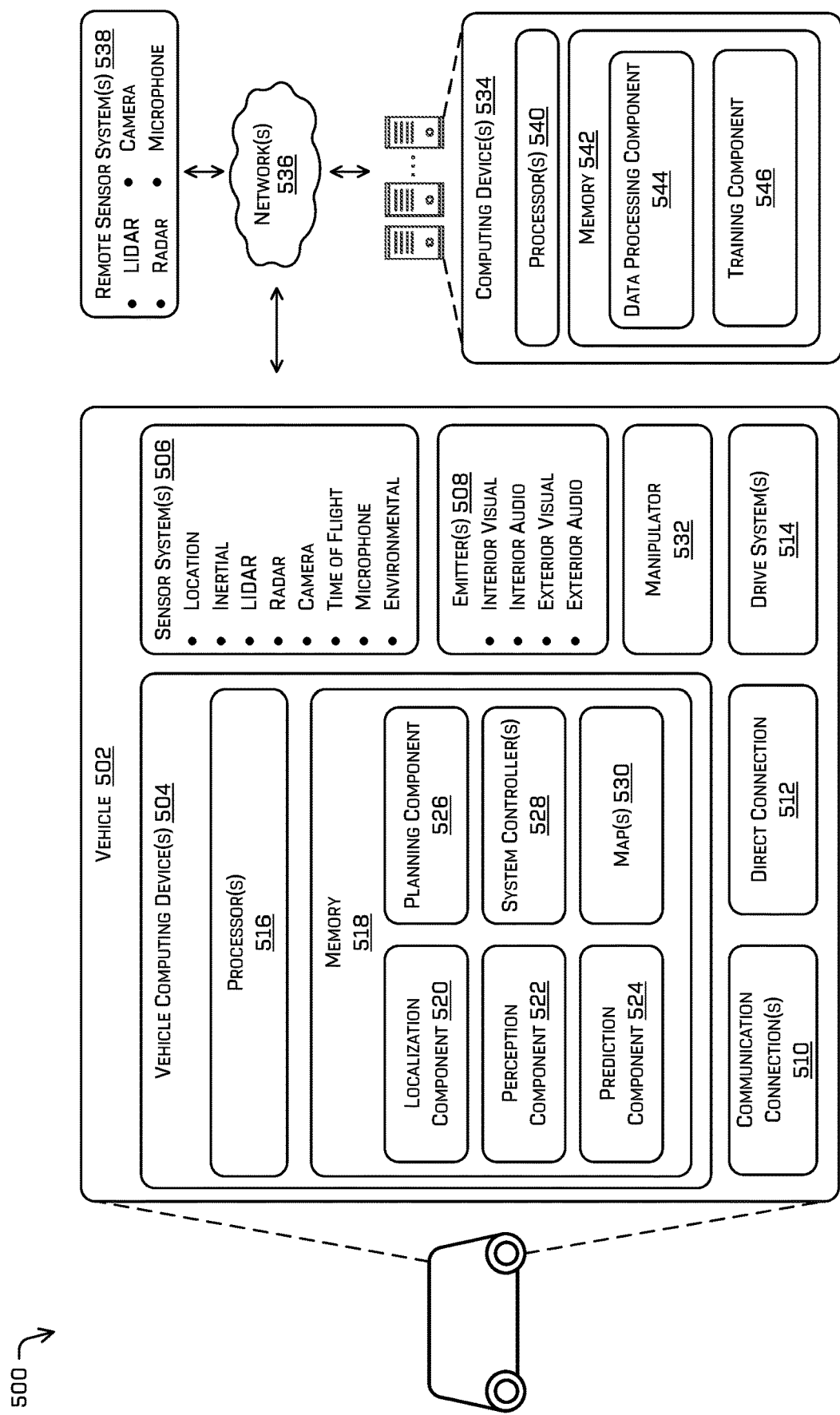
FIG. 5 is a block diagram of an example system for implementing the techniques described herein.

In some examples, the lidar data 110 can be sent from the lidar sensor 108 to a computing device 120 such as a vehicle computing device (e.g., the vehicle computing device(s) 504 of FIG. 5 and/or the computing device(s) 534). For example, the lidar data 110 can be used by a perception component 122 that is configured to sense the environment. The perception component 122 may, for example, be associated with a vehicle, such as an autonomous vehicle traversing the environment. In such examples, the perception component 122 can represent functionality provided by the perception component 522 in FIG. 5 to detect one or more objects in the environment. By implementing the cover 102, fewer errors are included in the lidar data 110 usable by the perception component 122 which improves accuracy of determinations and/or predictions by the perception component 122 (e.g., improves a location, orientation, or determination associated with an object). For instance, the lidar data 110 can be used to cause the computing device 120 to initiate a cleaning system to clean the lidar sensor 108, cause a vehicle to navigate to a safe location, cause a vehicle to receive assistance from a teleoperator (e.g., a remote computing device), alter a setting of the lidar sensor 108 (e.g., increase power output and/or reduce reliance on the lidar sensor 108 in favor of other available sensors, etc.), and so on. Performing the one or more actions based at least in part on the lidar data 110 is discussed throughout this disclosure including in FIG. 5.

FIG. 1B is an illustration of an example vehicle 124 having one or more sensor pod assemblies configured with multiple sensors to collect information about the surroundings of the vehicle, in accordance with examples of the disclosure.

In the illustrated example, the vehicle 124 includes a first sensor pod assembly 126A and a second sensor pod assembly 126B (collectively "sensor pods 126") coupled to a body 128. Each of the sensor pod assemblies 126 in this example include multiple sensors and may include systems or structures to clean or protect the sensor pod or others during an impact such as the cover 102. For example, the sensor pod assembly 126A includes a first sensor 130, a second sensor 132, and a third sensor 134. In some example, these sensors may be of a first type, for example, an imaging sensor. In some examples, the sensor pod assembly 126A also includes the lidar sensor 108 (e.g. a fourth sensor) and a fifth sensor 136. In some examples, these sensors may be of a second type, for example a light detection and ranging (lidar) sensor.

In some examples, the sensor pod assembly 126A also has an outer shell 138 or trim. In some examples the outer shell 138 incorporates an energy absorbing structure that may mitigate damage to an object that impacts the sensor pod assembly 126A.

The cover 102 can be configured to protect one or more sensors of the sensor pod assembly 126A from an obstruction (e.g., the obstruction 104). For example, while shown in FIG. 1B to protect the lidar sensor 108, the cover 102 can also or instead protect one or more of: the first sensor 130, the second sensor 132, the third sensor 134, or the fifth sensor 136. In some examples, at least a portion of the cover 102 (e.g., a lid, brim, etc.) may extend to cover at least a portion of another sensor in the pod assembly 126A (in addition to the lidar sensor 108). In some examples, the cover 102 can also be configured to protect another sensor that is not included in the sensor pod assembly 126A such as a sensor adjacent to the sensor pod assembly 126A (e.g., a sensor on a roof of the vehicle 124). In some examples, the lidar sensor 108 can include the cover 102 to protect the lidar sensor 108 in the sensor pod assembly 126A. As mentioned, the cover 102 can shield liquid from contacting a lens, direct the liquid away from the lens, and/or direct the liquid to a particular portion of the lens to reduce obstructing a field of view of the lidar sensor 108. For instance, the channel 112 and/or the opening 114 can be located in the cover 102 to cause the liquid to be directed away from the lens of the lidar sensor 108 and in some examples towards the body 128. Further, a downspout, tube, or cavity can direct the liquid from the opening 114 to an area below a surface of the sensor pod assembly 126A (e.g., away from each of the sensors in the sensor pod assembly). Additional details of the sensor pod assembly are described in U.S. patent application Ser. No. 16/864,082, filed Apr. 30, 2020, entitled "Sensor Pod Assembly," which is incorporated herein by reference in its entirety and for all purposes.

In some examples, the cover 102 can be integrated into the body 128 of the vehicle 124. For example, the opening 114 can direct an obstruction such as liquid from the cover 102 towards the body 128 to protect the sensor associated with the cover 102 from being obstructed. For example, the cover 102 can be integrated to the body 128 to cause water to flow from the cover 102 down a side of the vehicle 124.

Figure 2:
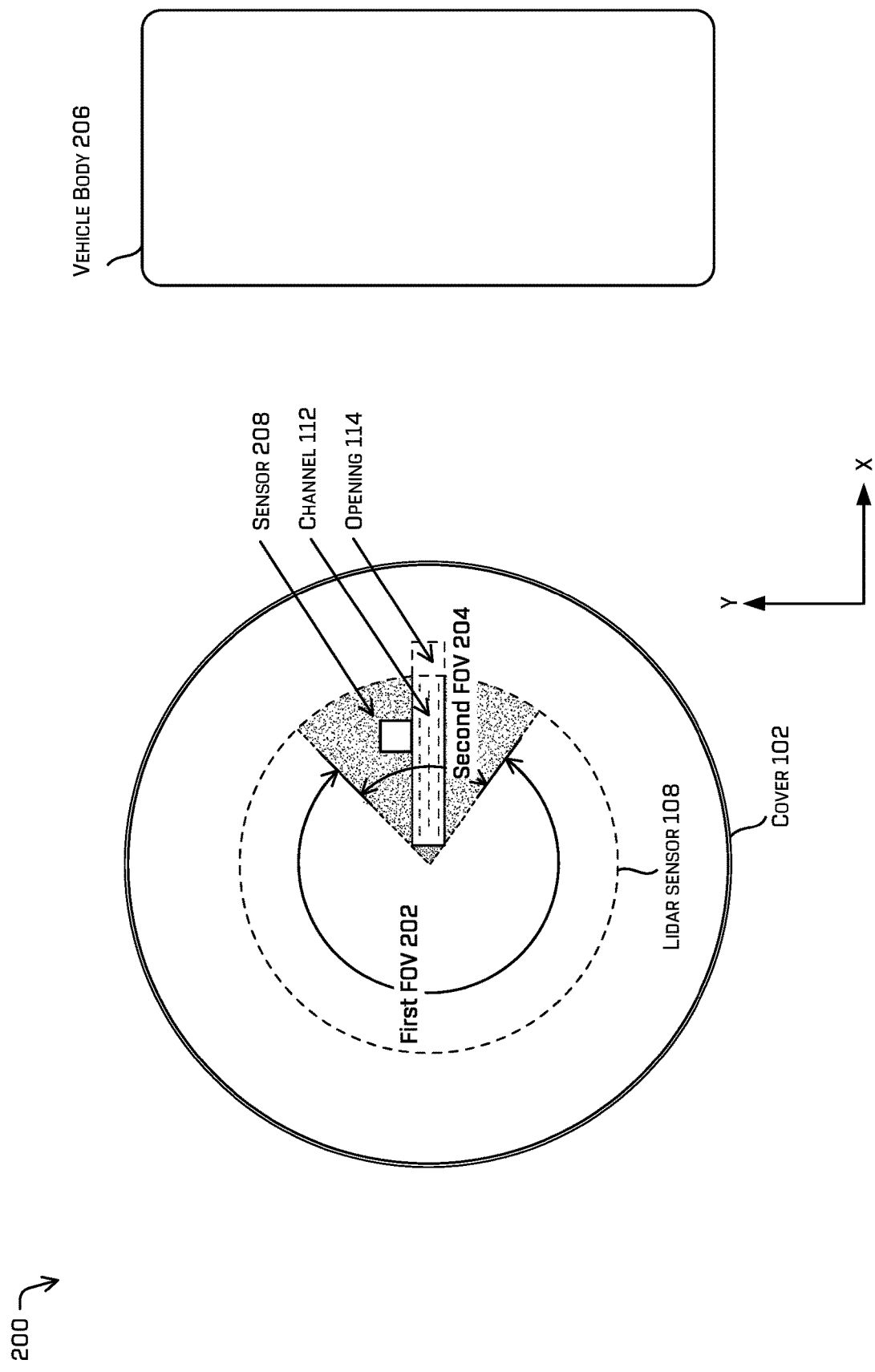
FIG. 2 is a pictorial diagram illustrating an example top view of the example cover assembly of FIG. 1A.

FIG. 2 is a pictorial diagram illustrating an example top view 200 of the cover 102 to protect an example sensor (lidar sensor 108). The top view 200 in FIG. 2 shows a perimeter of the cover 102 that is greater than a perimeter of the lidar sensor 108 as well as the channel 112 and the opening 114 of FIG. 1A.

In various examples, the channel 112 can extend from the perimeter of the lidar sensor 108 towards a center of the cover 102. In some examples, the channel 112 can extend beyond the perimeter or side portion of the lidar sensor 108. In this way, a slop and/or curve associated with a top surface of the cover 102 can direct an obstruction such as liquid from a perimeter of the cover 102 to the channel 112. The channel 112 can include a sloped surface (e.g., depth increasing gradually towards the opening 114) to direct the liquid to the opening 114 which allows the liquid to exit the channel 112 to another channel disposed on a side of the lidar sensor 108 and/or to an enclosed tube that diverts the liquid away from the side of the lidar sensor 108. Of course, in some examples the channel 112 can extend down the side of the lidar sensor as a single channel that relocates the liquid in the channel 112 to a side surface of the lidar sensor. In examples that include the enclosed tube (e.g., a downspout), the enclosed tube can include a first end at the opening 114 and a second end that bypasses the side surface of the lidar sensor 108 to expel the liquid away from the lidar sensor 108. In some examples, the second end of the enclosed tube can expel the liquid into a liquid containment unit (e.g., a reservoir for storing liquid such as rainwater).

The liquid containment unit can, for example, store the obstruction 104 for use during a cleaning operation such as a jet of water to clean a surface of the lidar sensor 108. In some examples, the liquid containment unit can also include a cleaning solution to combine with the obstruction 104 for use during the cleaning operation.

In examples that include the enclosed tube, the lidar sensor 108 (or other sensor associated with the cover 102) can be configured to ignore or compensate reading associated with the downspout. For example, the lidar sensor 108 can be calibrated to account for presence of the downspout thereby minimizing or eliminating potential effects of the downspout on the lidar data 110.

As shown in FIG. 2, the channel 112 is configured to receive an obstruction (e.g., the obstruction 104) from a first field of view (FOV) 202 and divert the obstruction to a second field of view 204. The first FOV 202 can represent an area that the lidar sensor 108 can use to "sense" a first portion of the environment while the second FOV 204 can be associated with a second portion of the environment at least some of which is different from the first FOV 202. For example, the first FOV 202 and the second FOV 204 can be associated with angles that are different (as shown in FIG. 2) or at least partially overlap. The second FOV 204 can, for example, be disposed between an emitter of the lidar sensor and a vehicle body 206

In some examples, the cover 102 can include a first region that is associated with the first FOV 202 and a second region associated with the second FOV 204. Generally, the first FOV 202 can be associated with a higher likelihood to detect an object in an environment than the second FOV 204. For instance, in examples when the lidar sensor 108 is attached to a vehicle, the first FOV 202 can generally be away from a center of the vehicle (e.g., away from the vehicle body 206) while the second FOV 204 can include at least some angles that are towards the vehicle body 206. In various examples, the first FOV 202 can be greater than the second FOV 204, though dimensions with the first FOV 202 and/or the second FOV 204 can vary.

In some examples, the cover 102 can include a sensor 208 configured to measure an amount of liquid associated with the cover 102. For example, the computing device 120 can implement to the sensor 208 (e.g., an accumulation sensor) to measure an amount of liquid flowing through the channel 112. The position of the sensor 208 can vary in different configurations and may be disposed in the channel 112 (e.g., on a side of the channel, a bottom of the channel, etc.) and/or adjacent to the channel 112. In some examples, the sensor 208 can measure an amount of liquid in the cover 102 (e.g., determine an amount of rainfall).

The cover 102 can also include a moveable portion (not shown) that is configured to hold and/or release liquid from the cover 102. For example, the movable portion can be located near the opening 114 and receive a signal from the computing device 120 to cause the moveable portion to operate between a first position at which the opening 114 can release liquid and a second position at which the opening 114 is closed to retain the liquid in the cover 102. In some examples, the sensor 208 can measure a volume of the liquid, a rate of flow of the liquid, and so on, when the moveable portion is at the first position and/or the second position. In various examples, the moveable portion can change between the positions using a gear, motor, servo, etc.

Figure 3:
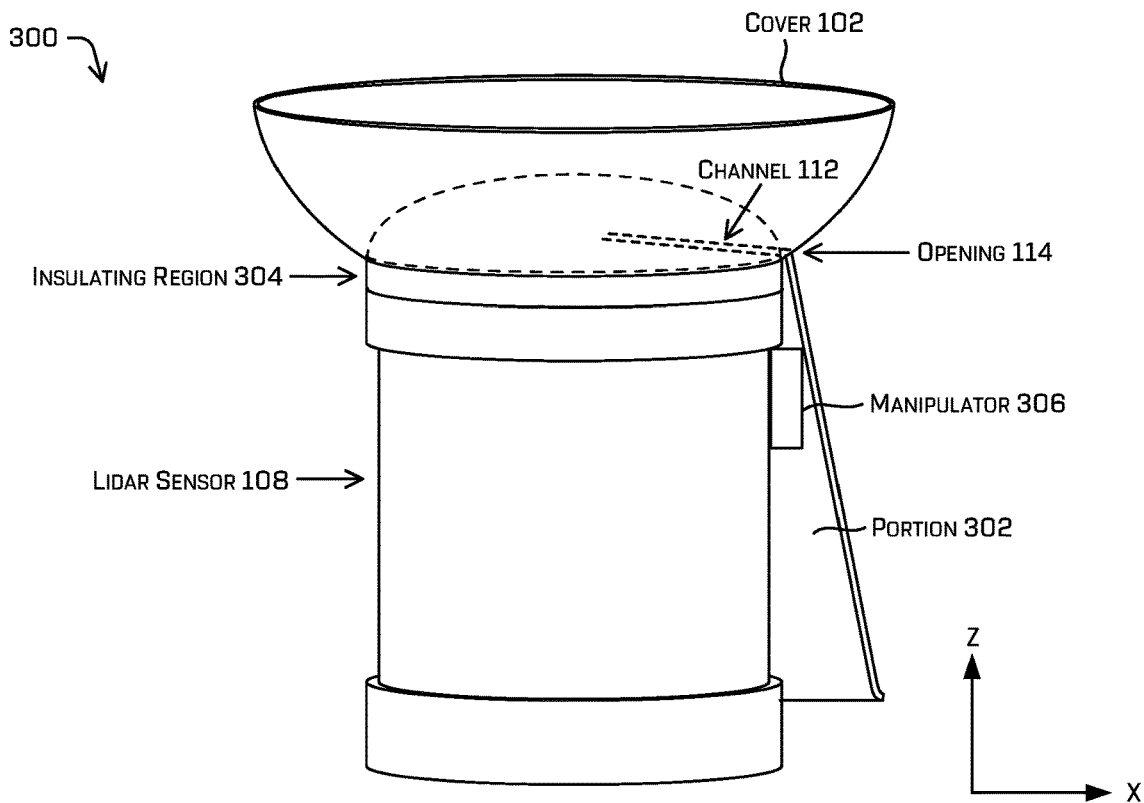
FIG. 3 is a pictorial diagram illustrating example view of a sensor with the example cover assembly of FIG. 1A.

FIG. 3 is a pictorial diagram illustrating an example view 300 of an example cover 102 to protect an example sensor (lidar sensor 108). The view 300 is taken from the side and slightly above the sensor. For instance, the cover 102 can be configured to divert an obstruction (the obstruction 104) away from the lidar sensor 108 coupled to a vehicle. In some examples, the obstruction (e.g., rain, sleet, frozen rain, mud, etc.) can be associated with a weather event or another object (e.g., water or mud from another vehicle, windshield washer fluid from another vehicle, etc.).

As illustrated in FIG. 3, in some examples, the cover 102 can include a portion 302 proximate a side of the lidar sensor 108 and extending between the opening 114 and a location before, at, or below a bottom of the lidar sensor 108 (e.g., beyond an area used for emitting beams from the lidar sensor 108). In some examples, the portion 302 can include a channel, such as the channel 112, a trough, a groove, a canal, or other recessed portion and can extend from an area near a center of the cover 102 to and including the portion 302 to divert liquid past the lidar sensor 108 on a particular portion of an exterior of the lidar sensor 108 (e.g., within a particular portion of a FOV of the lidar sensor 108). In some examples, the channel in the portion 302 can be enclosed as in the case of a pipe, tube, downspout, or other enclosed channel that transports the obstruction (e.g., a liquid) from the opening 114 to an area below a side of the lidar sensor 108. In other examples, the portion 302 can be open on at least one side (e.g., not enclosed). In examples that the lidar sensor 108 can be included in and/or be part of a sensor assembly with one or more other sensors, the channel associated with the portion 302 can extend to at least a bottom surface of the sensor assembly.

In some examples, a slope of the portion 302 can vary between having no slope (e.g., substantially vertical) to having a negative slope from a top of the portion 302 to a bottom of the portion 302 as shown in FIG. 3.

In some examples, the cover 102 can be configured to create an insulating region 304 representing a space between the cover 102 and the lidar sensor 108 to help reduce solar heat. For example, the insulating region can enable the cover 102 to shade the housing of the lidar sensor 108 and reduce temperatures within the lidar sensor housing. In some examples, the cover 102 can include a space having a distance (e.g., 10-100 millimeters) above a top surface of the lidar sensor (or lidar sensor housing). In that case, the insulating region 304 between the cover 102 and the housing of the lidar sensor 108 may comprise an air gap or may comprise an insulative material. In some examples, a bottom surface of the cover 102 can comprise a thermally insulating material to further reduce solar energy imparted to the lidar sensor housing. By configuring the cover 102 to include the insulating region 304 as described herein, affects of heat on operation of the lidar sensor 108 can be mitigated.

As mentioned, in some examples, the cover 102 can include a manipulator 306 to move (e.g. rotate, change orientation, etc.) relative to the lidar sensor 108. For example, the manipulator 306 can represent a passive manipulator (e.g., a vane, fin, foil, blade, etc.) that captures air and causes the cover to rotate or change orientation relative to the lidar sensor 108 based on a direction of travel of the vehicle and/or a wind direction. In various examples, the manipulator 306 can be active manipulator, such as a motor, servo, etc., which can control a position and/or orientation of the cover 102 to direct the portion 302 to a field of view (e.g., the second FOV 204) associated with the lidar sensor 108. In some examples, the passive manipulator and/or the active manipulator can initiate rotation or other changes in orientation of the cover 102 based at least in part on wind speed or motion of a robotic device on which the lidar sensor 108 is attached (e.g., vehicle motion), a wind direction, a direction of travel of the robotic device, etc.). In some examples, a wind speed, an amount of the liquid, a direction of arrival of the liquid, and/or a direction of travel of the robotic device can cause the cover 102 to move to align the portion 302 to a particular field of view that is least likely to impact lidar data captured by the lidar sensor relative to another available field of view.

In some examples, the portion 302 can be formed integrally with the manipulator 306 while in other examples, the portion 302 and the manipulator 306 can be separate components.

By way of example and not limitation, an autonomous vehicle that is bi-directional (a front region can change depending upon a direction of travel) can include one or more lidar sensors at fixed positions and one or more corresponding covers. The cover(s) 102 can rotate and/or change orientation to reduce an obstruction on a housing of the lidar sensor based at least in part on a location of the lidar sensor. For instance, a lidar sensor in the front region can include a cover having a different orientation than a lidar sensor in a rear region of the autonomous vehicle. The aforementioned passive manipulator and/or the active manipulator can cause the channel 112 and/or the portion 302 to change position (change angle relative to a ground surface, rotate, etc.) to direct the obstruction to the second FOV 204 that is less likely to require detection of an object relative to the first FOV 202). In this way, the cover 102 can adapt to a direction of travel for the autonomous vehicle, a wind speed, a direction of the rain, etc. to minimize an impact of the obstruction on the lidar sensor.

In some examples, the cover 102 and/or the portion 302 of the cover 102 can be configured aerodynamically to reduce a force from wind on the cover 102 and/or the portion 302 at varying speeds. For instance, the cover 102 can be configured to include a shape that improves wind resistance and directs airflow onto a surface of the lidar sensor 108 (e.g., a side surface from which beams are emitted) to remove and/or prevent an obstruction from adhering to the lidar sensor 108.

In various examples, a sensor cover assembly that includes one or more of: the cover 102, a channel(s) (e.g., a downspout, a gutter, etc.), a heater, etc. can be configured to crumple upon impact by an object. For example, the cover 102 can include one or more crumple zones designed to deform to reduce impact by the object on the lidar sensor 108. In some examples, an impact with the object can cause the cover 102 to crumple, or in some instances become decoupled from the lidar sensor 108 to reduce a force between the object and the cover 102. The object can be a pedestrian, for example, and the crumple zone can be integrated into the cover 102 to protect the lidar sensor 108 as well as the pedestrian by absorbing at least some of the force between the pedestrian and the cover 102.

In various examples, the cover 102 can be integrated into the lidar sensor 108 such that the cover 102 and the lidar sensor 108 are manufactured together. In other examples, the cover 102 can be removably coupled to the lidar sensor 108 so that the cover 102 can be added, replaced, and/or removed as needed using fasteners of various types. The cover 102 can, for example, be manufactured by a different manufacturer of the lidar sensor and be added to the lidar sensor after the lidar sensor is mounted on a robotic device.

Figure 4:
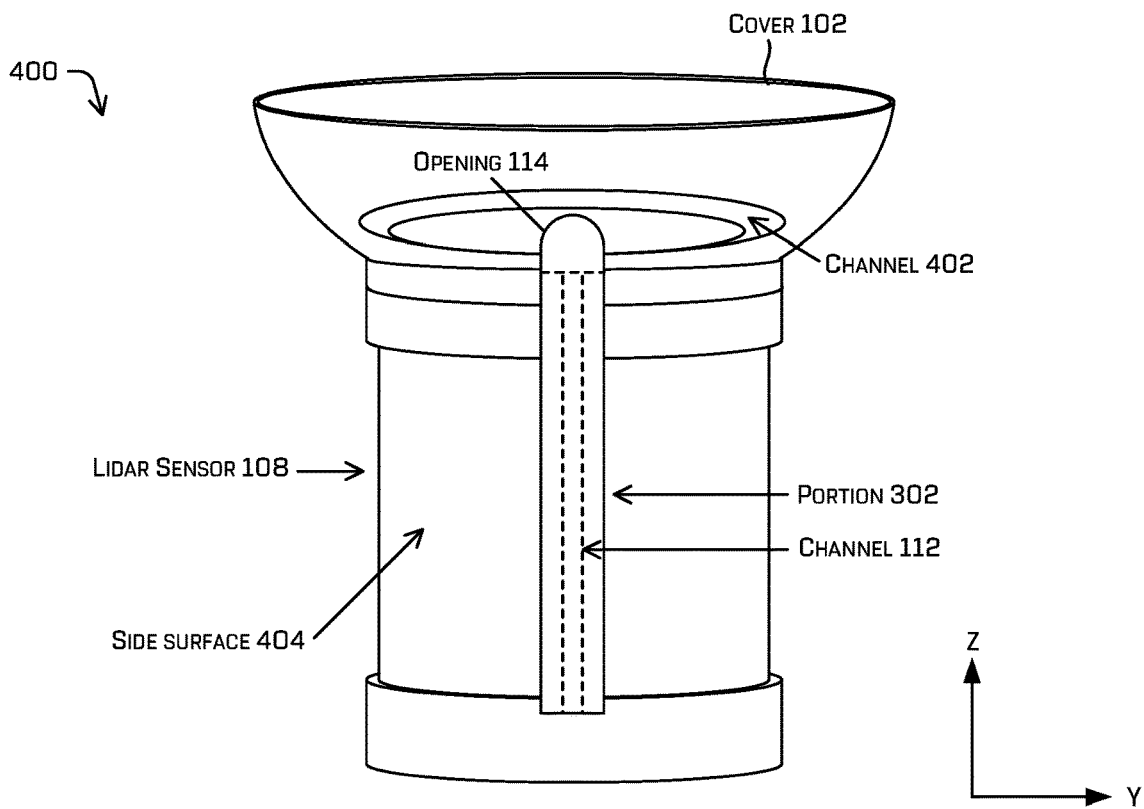
FIG. 4 is a pictorial diagram illustrating an example view of the sensor with the example cover assembly of FIG. 1A.

FIG. 4 is a pictorial diagram illustrating another example view 400 of an example cover 102 to protect an example sensor (lidar sensor 108). The view 400 shows a channel 402 (e.g., a second channel in examples that include the channel 112) along at least a portion of a circumference of the cover 102. For instance, the channel 402 can represent a gutter that directs the obstruction towards the channel 112 and/or the opening 114. In various examples, the channel 402 can be configured to collect rainwater and to direct the collected rainwater to the channel 112.

The view 400 illustrates the channel 112 extending from a top of the lidar sensor 108, along the portion 302, past a bottom of a side surface 404 of the lidar sensor 108. In some examples, the channel 112 can include a first end equal to or below the side surface 404 and a second end that receives the liquid from the channel 402. In some examples, the second end of the channel 112 can extend towards a center of a top surface of the cover 102 similar to the channel 112 shown in FIG. 2.

As mentioned, a sensor cover assembly that includes the cover 102 can further include one or more heating elements attached to or in a vicinity of the cover 102, the portion 302, a downspout (if included), a gutter (if included). For example, the one or more heating elements can include a heater that provides thermal energy to an area of the cover 102 that causes snow, sleet, freezing rain, and the like, to change to a liquid. In some examples, the portion 302, the downspout, and/or the gutter may also be heated (receive thermal energy from a same or different heater(s)). As the obstruction (e.g., snow, sleet, freezing rain, and the like) changes to a liquid, the cover 102 can divert the liquid away from the lidar sensor 108 as discussed herein thereby reducing an amount of backscattering associated with the lidar sensor 108 otherwise caused by the obstruction.

In various examples, examples the liquid can be stored in a liquid containment unit for a cleaning operation. For example, rainwater can be collected from the opening 114, the downspout, or another channel into the liquid containment unit for use with a cleaning system to clean at least a portion of the lidar sensor 108. In various examples, the rainwater can be mixed with a cleaning solution and be sprayed by a jet of the cleaning system onto a housing or lens of the lidar sensor that is associated with an obstruction. Additional details of cleaning a sensor are described in U.S. patent application Ser. No. 16/864,146, filed Apr. 30, 2020, entitled "Sensor Pod Cleaning System," which is incorporated herein by reference in its entirety and for all purposes.

By implementing the sensor cover assembly as described herein, an obstruction (e.g., the obstruction 104) can be diverted away from the first FOV 202 and to the second FOV 204 thereby improving an accuracy of lidar data captured by the lidar sensor 108. In some examples, the lidar data from the lidar sensor 108 can be sent to a vehicle computing device associated with a vehicle (e.g., the vehicle 502 of FIG. 5). The vehicle can perform various actions based at least in part on the lidar data (e.g., the lidar data 110). For instance, a planning component can use the lidar data to determine a trajectory for the vehicle to follow in an environment. The trajectory (e.g., direction, speed, acceleration, etc.) can enable the vehicle to avoid static and/or dynamic objects such as a pedestrian and/or another vehicle, just to name a few. The lidar data can also or instead be used by the vehicle computing device to determine a position, a pose, a velocity, etc., of the vehicle. Potential actions by the vehicle are further described in relation to FIG. 5, and elsewhere. By implementing the techniques described herein, safety of an autonomous vehicle can be improved by performing an action that mitigates an obstruction of a sensor used for "seeing" an environment (e.g., detection of objects can be improved to enable the vehicle to navigate more safely).

FIG. 5 is a block diagram of an example system 500 for implementing the techniques described herein. In at least one example, the system 500 can include a vehicle 502. In the illustrated example system 500, the vehicle 502 is an autonomous vehicle; however, the vehicle 502 can be any other type of vehicle.

The vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 502 can include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 can be configured to capture sensor data associated with an environment. The sensor cover assembly including the cover 102 of FIG. 1A can be used to protect one or more of the sensor system(s) 506 from an obstruction (e.g., the obstruction 104). For instance, sensor cover assembly can divert a liquid such as rainwater away from a sensor of the sensor system(s) 506 using the techniques described herein.

The one or more sensor system(s) 506 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The one or more sensor system(s) 506 can provide input to the computing device 504.

The vehicle 502 can also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enable communication between the vehicle 502 and one or more other local or remote computing device(s) (e.g., a remote teleoperation computing device) or remote services. For instance, the one or more communication connection(s) 510 can facilitate communication with other local computing device(s) on the vehicle 502 and/or the one or more drive system(s) 514. Also, the one or more communication connection(s) 510 can allow the vehicle 502 to communicate with other nearby computing device(s) (e.g., other nearby vehicles, traffic signals, etc.).

The one or more communications connection(s) 510 can include physical and/or logical interfaces for connecting the computing device 504 to another computing device or one or more external networks 536 (e.g., the Internet). For example, the one or more communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 can include one or more drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more components to perform various functionalities of the drive system(s) 514. Furthermore, the drive system(s) 514 also include one or more communication connection(s) that enable communication by the respective drive system with one or more other local or remote computing device(s).

The computing device 504 can include one or more processor(s) 516 and memory 518 communicatively coupled with the one or more processor(s) 516. In the illustrated example, the memory 518 of the computing device 504 stores a localization component 520, a perception component 522, a prediction component 524, a planning component 526, one or more system controllers 528, and one or more maps 530. Though depicted as residing in the memory 518 for illustrative purposes, it is contemplated that the localization component 520, the perception component 522, the prediction component 524, the planning component 526, the one or more system controllers 528, and the one or more maps 530 may additionally, or alternatively, be accessible to the vehicle 502 (e.g., stored on, or otherwise accessible by, memory remote from the vehicle 502, such as, for example, on memory 542 of a remote computing device 534).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530 and/or a remote map component, and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 524 can generate one or more probability maps representing prediction probabilities of possible locations of one or more objects in an environment. For example, the prediction component 524 can generate one or more probability maps for vehicles, pedestrians, animals, and the like within a threshold distance from the vehicle 502. In some instances, the prediction component 524 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 524 may generate predicted trajectories of objects (e.g., objects) in an environment and/or to generate predicted candidate trajectories for the vehicle 502. For example, the prediction component 524 may generate one or more predicted trajectories for objects within a threshold distance from the vehicle 502. In some examples, the prediction component 524 may measure a trace of an object and generate a trajectory for the object based on observed and predicted behavior.

In general, the planning component 526 may determine a path for the vehicle 502 to follow to traverse through an environment. For example, the planning component 526 may determine various routes and trajectories and various levels of detail. For example, the planning component 526 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 526 may generate an instruction for guiding the autonomous vehicle along at least a portion of the route from the first location to the second location. In at least one example, the planning component 526 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 526 can select a trajectory for the vehicle 502 based at least in part on receiving data from a sensor that includes a sensor cover assembly.

In other examples, the planning component 526 can alternatively, or additionally, use data from the localization component 520, the perception component 522, and/or the prediction component 524 to determine a path for the vehicle 502 to follow to traverse through an environment. For example, the planning component 526 can receive data from the localization component 520, the perception component 522, and/or the prediction component 524 regarding objects associated with an environment. Using this data, the planning component 526 can determine a route to travel from a first location (e.g., a current location) to a second location (e.g., a target location) to avoid objects in an environment. In at least some examples, such a planning component 526 may determine there is no such collision free path and, in turn, provide a path which brings vehicle 502 to a safe stop avoiding all collisions and/or otherwise mitigating damage. Additionally, or alternatively, the planning component 526 can determine the path for the vehicle 502 to follow based at least in part on data received from the perception component 522, such as lidar data 110 representing the obstruction 104 as described in FIGS. 1A-4 and elsewhere.

In at least one example, the vehicle computing device 504 may include one or more system controllers 528, which may be configured to control steering, propulsion, braking, safety, emitters, communication, and other systems of the vehicle 502. The system controller(s) 528 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the prediction component 524, and/or the planning component 526 to determine a location of the vehicle 502, detect objects in an environment, generate routes, determine actions and/or trajectories to navigate within an environment.

In some examples, the one or more maps 530 may be stored on a remote computing device(s) (such as the computing device(s) 534) accessible via network(s) 536. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

In some examples, the vehicle 502 can include a manipulator 532 representing an active manipulator such as a motor, servo, or the like that causes the cover (e.g., the cover 102) of the sensor cover assembly to move relative to a housing of a sensor. For example, the manipulator 532 can represent a passive manipulator (e.g., a vane, fin, foil, blade, etc.) that captures air and causes the cover to rotate or change orientation relative to a lidar sensor based at least in part on a direction of travel of the vehicle 502 and/or a wind direction. In various examples, the manipulator 532 can be active manipulator, such as a motor, servo, etc., which can control a position and/or orientation of the cover 102 to direct the portion 302 to a field of view (e.g., the second FOV 204). In some examples, the passive manipulator and/or the active manipulator can initiate rotation or other changes in orientation of the cover 102 based at least in part on sensor data from the sensor system(s) 506. In some examples, the system controller(s) 528 may communicate with and/or control the manipulator 532 associated with a sensor cover.

In some examples, the vehicle 502 may send sensor data to the computing device(s) 534 via the network(s) 536. In some examples, the vehicle 502 may receive sensor data from the computing device(s) 534 and/or remote sensor system(s) 538 via the network(s) 536. The sensor data may include raw sensor data and/or processed sensor data and/or representations of sensor data. In some examples, the sensor data (raw or processed) may be sent and/or received as one or more log files. In one example, the sensor data can correspond to the lidar data 110 and can include historical obstruction scores for one or more sensors.

The computing device(s) 534 may include processor(s) 540 and a memory 542 storing a data processing component 544, and a training component 546. In various examples, the data processing component 544 may be configured to receive data from one or more remote sensors, such as the sensor system(s) 506 and/or remote sensor system(s) 538. In some examples, the data processing component 544 may be configured to process the data and send processed sensor data to the vehicle computing device 504, such as for use by the perception component 522, the prediction component 524, and/or the planning component 526.

As can be understood, the components discussed herein (e.g., the data processing component 544, and the training component 546) are described as divided for illustrative purposes. However, the operations performed by the various components may be combined or performed in any other component.

As discussed, sensor data from one or more sensors, such as the lidar data 110, can be used by various components of the vehicle computing device 504. For example, lidar data from a lidar sensor that include the cover 102 can be used to cause the vehicle 502 to take an action (e.g., a relatively low score can cause the vehicle to stop, pull over, etc., determine a maximum speed for the vehicle to operate, etc.) and/or cause a change in sensor contributions (e.g., a poorly operating sensor can contribute less to sensor fusion).

In some instances, the training component 546 can include functionality to train a machine learning model to determine how to control an active manipulator (e.g., the manipulator 532) to adjust a position of the cover to minimize obstruction of an associated sensor under different conditions (e.g., type/extent of obstruction, direction of travel, wind direction, etc.). For example, the training component 546 can receive data (e.g., sensor data that represents an obstruction, vehicle data, environmental data, etc.) and at least a portion of the data can be used as an input to train the machine learning model.

In some instances, the training component 546 may be executed by the processor(s) 540 to train a machine learning model based on training data. The training data may include a wide variety of data, such as sensor data, audio data, image data, map data, inertia data, vehicle state data, historical data (log data), or a combination thereof, that is associated with a value (e.g., a desired position, inference, prediction, etc.). Such values may generally be referred to as a "ground truth." To illustrate, the training data may be used for determining a position of a sensor cover relative to a housing of the sensor.

While examples are given in which the techniques described herein are implemented by a detector component of the vehicle, in some examples, some or all of the techniques described herein could be implemented by another system of the vehicle, such as a secondary safety system. Generally, such an architecture can include a first computing device to control the vehicle 502 and a secondary safety system that operates on the vehicle 502 to validate operation of the primary system and to control the vehicle 502 to avoid collisions.

In some instances, aspects of some or all of the components discussed herein may include any models, techniques, and/or machine learned techniques. For example, in some instances, the components in the memory 518 (and the memory 542, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 516 of the computing device 504 and the processor(s) 540 of the computing device(s) 534 can be any suitable processor capable of executing instructions to process data and perform operations as described herein. By way of example and not limitation, the processor(s) 516 and the processor(s) 540 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 of the vehicle computing device 504 and the memory 542 of the computing device(s) 534 are examples of non-transitory computer-readable media. The memory 518 and the memory 542 can store an operating system and one or more software applications, instructions, programs, and/or data to implement the methods described herein and the functions attributed to the various systems. In various implementations, the memory 518 and 542 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Accordingly, the techniques discussed herein provide a robust implementation of determining a calibration score associated with a sensor to determine a level of accuracy of the sensor to allow the safe operation of an autonomous vehicle.

It should be noted that while FIG. 5 is illustrated as a distributed system, in alternative examples, components of the vehicle 502 may be associated with the computing device(s) 534 and/or components of the computing device(s) 534 may be associated with the vehicle 502. That is, the vehicle 502 may perform one or more of the functions associated with the computing device(s) 534, and vice versa.

Figure 6:
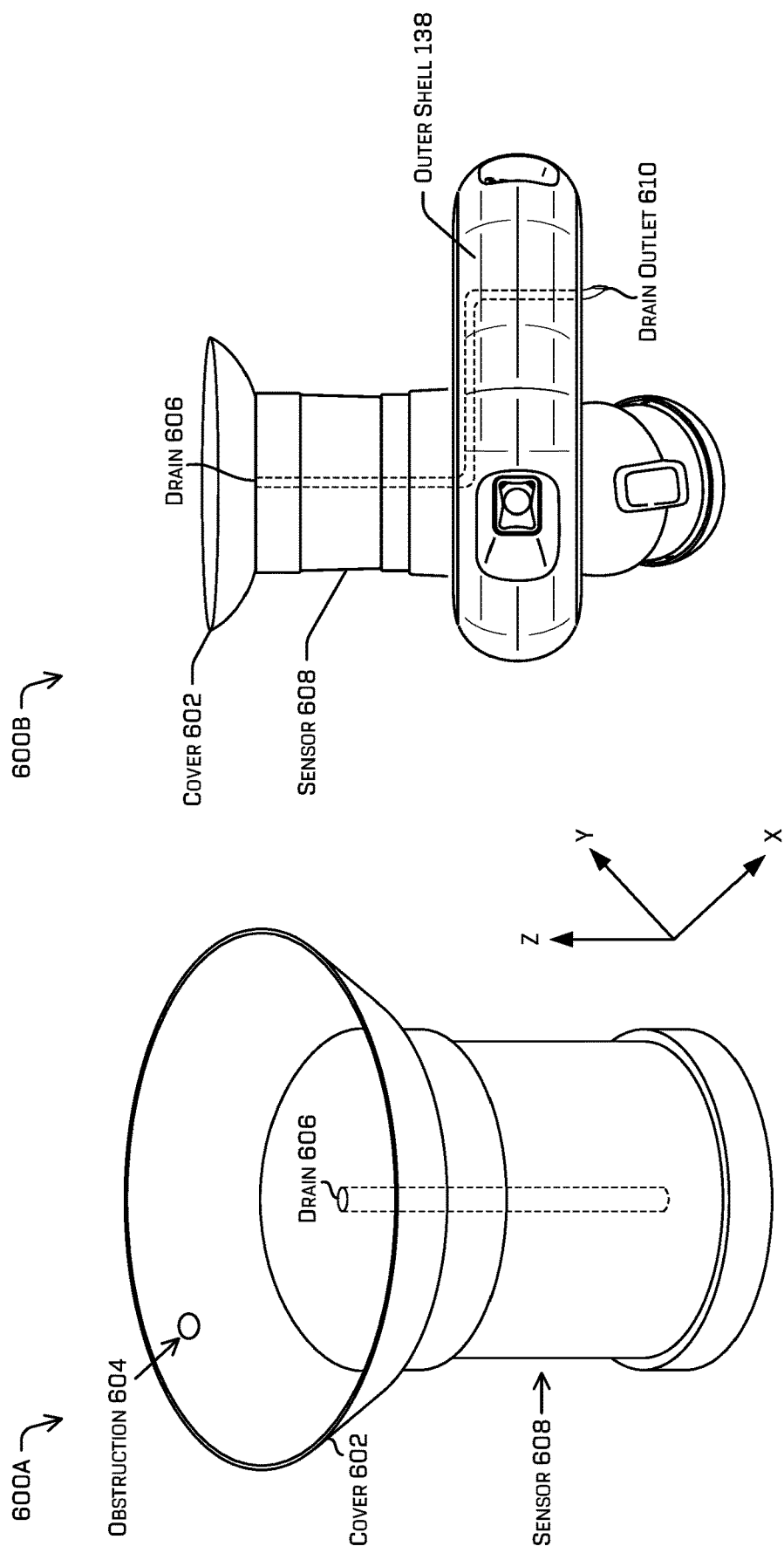
FIG. 6A is a pictorial diagram illustrating an example view of a sensor with an example cover assembly.
FIG. 6B is a pictorial diagram illustrating an example view of a sensor pod with an example cover assembly.

FIG. 6A is an illustration of an example sensor cover assembly 600A to protect an example sensor from an obstruction. For instance, the sensor cover assembly 600A can include a cover 602 configured to direct or divert an obstruction 604 toward a drain 606 thereby preventing the obstruction 604 from covering a side of a sensor 608. In some examples, the obstruction 104 can be a liquid (e.g., rain or other weather event), and a shape and/or an orientation of the cover 102 can be configured to direct the liquid away from a side surface of the sensor 608 to improve accuracy of data captured by the sensor 608 (relative to not implementing the cover 102). In some examples, the obstruction 604 may be precipitation (e.g., rain, snow, sleet, hail, etc.), contaminants (e.g., dust, dirt, mud, bird droppings, etc.), or other obstructions.

In some examples, the cover 602 can be configured similar to the cover 102 of FIGS. 1A-4. For instance, the cover 602 can include one or more channels, a trough, a brim, or other configurations to protect the sensor 608 from the obstruction 604. As shown in FIG. 6A, the drain 606 can represent an opening at a radial center of the sensor 608. In various examples, the drain 606 can represent a hollow tube having a first end at the cover 102 and a second end that extends to a bottom of the side surface of the sensor 608. In other examples, the drain 606 can represent an opening in the cover 602 at a center of the cover 102 and/or a center of the sensor 608 (e.g., a radial center). Generally, the drain 606 is configured to remove the obstruction from an area of the cover 102 and direct the obstruction away from a surface of the sensor 608 usable for detecting an environment.

In some examples, the sensor 608 can be a spinning lidar sensor (e.g., a mechanical spinning lidar sensor) having a circular and/or cylindrical shape though other sensor types are also contemplated (e.g., a solid state lidar sensor or other sensor). In some examples, the sensor 608 may be coupled to a vehicle (e.g., the autonomous vehicle 502) and the drain 606 can extend towards a body of the vehicle or other area. In various examples, the cover 602 can include a sloped surface or a curved surface to direct the obstruction 604 toward the drain 606. In some examples, the cover 602 can include a trough (e.g., the channel 112) to direct the obstruction 604 from a side portion of the cover 602 towards the drain 606.

In some examples, the drain 606 can receive the obstruction 604 from the cover 602 and exhaust the obstruction through an area defined internally to the sensor 608. For example, the drain 606 can direct the obstruction 604 towards an interior portion of the sensor (e.g., an area internal to a housing and/or a lens of the sensor).

FIG. 6B is a pictorial diagram illustrating an example sensor pod 600B with an example cover assembly. For instance, the sensor pod 600B can be configured similar to the sensor pod 126A of FIG. 1B, and can include the cover 602 to direct or divert an obstruction toward the drain 606. As shown in FIG. 6B, the drain 606 can represent an opening in the cover 602 that extends into an interior portion of the sensor 608 and an interior portion of the sensor pod 600B (e.g., an area inside the outer shell 138 or enclosure housing two or more sensors). In various examples, the drain can include a first end adjacent the cover 602 and a second end representing a drain outlet 610. In such examples, the second end of the drain can be at an opposite end of the housing as the first end of the drain. The drain outlet 610 can be configured to direct the obstruction away from the sensor 608 and/or the sensor pod 600B (e.g., away from one or more sensors of the sensor pod). Generally, the cover 602 can protect the sensor 608 and at least one other sensor of the sensor pod 600B from the obstruction 604.

In some examples, the drain 606 may be, or may pass through, a hollow central shaft of a rotatable lidar sensor. For example, the cover 602 can divert the obstruction 604 to the drain 606 which then transmits the obstruction 604 through a central shaft of the sensor 608 to the drain outlet 610. The central shaft can, for example, represent a hollow tube that enables the obstruction 604 to move from the cover 602 to the drain outlet 610. In various examples, the central shaft may be disposed at and/or aligned with an axis of rotation center of a housing of the sensor 608. The central shaft may be rotatable with the rotatable elements (e.g., emitters, sensors, etc.) mounted thereto, or the central shaft may be stationary and the rotatable elements may spin around the central shaft.

In some examples, the drain outlet 610 can be fixed to the housing of the lidar sensor and be configured to direct the obstruction at any angle relative to a body of a vehicle (e.g., toward it, away from it, etc.). In some examples, the drain outlet 610 can rotate (e.g., passively or actively by a manipulator) to direct the obstruction 604 toward a specific direction and/or area, such as toward a trailing end of the vehicle. For instance, a manipulator can cause the drain outlet 610 to rotate to direct the obstruction 604 away from a field of view usable by the vehicle.

In various examples, the sensor pod 600B may be coupled to a vehicle (e.g., the autonomous vehicle 502) and the drain outlet 610 can be positioned away from a side surface of the sensor 608 (or other sensor). For instance, the drain outlet 610 can include a shape that directs the obstruction towards a body of the vehicle. In this way, sensor(s) of the sensor pod 600B can be protected from the obstruction obstructing a field of view associated with the sensor(s) (e.g., an area of the sensor used for detecting an environment).

In some examples, a screen (not shown) can be associated with the drain 606 to protect debris of a given size from entering the drain 606. For example, the screen can prevent debris larger than a size of an opening of the screen from going into the drain 606. In various examples, the screen can be configured to prevent debris larger than a size of the opening of the screen from entering the drain 606. By way of example and not limitation, the screen can have openings of at least about 0.01 mm to at most about 2 mm, and in some examples between about 0.1 mm to about 0.5 mm.

In some examples, a screen can be associated with the drain outlet 610 to prevent contaminates from entering or otherwise blocking the drain outlet 610 (e.g., prevent mud, dirt, leaves, an insect or other animal, etc. from blocking the drain outlet 610 internally or externally).

In some examples, a heater can be included proximate the drain 606 to provide thermal energy to an area of the drain. In this way, the heater can prevent the obstruction 604 (e.g., a liquid, snow, etc.) from freezing inside of and/or near the drain 606. In some examples, the heater can be included inside the enclosure (e.g., the outer shell 138) of the sensor pod 600B.

Figure 7:
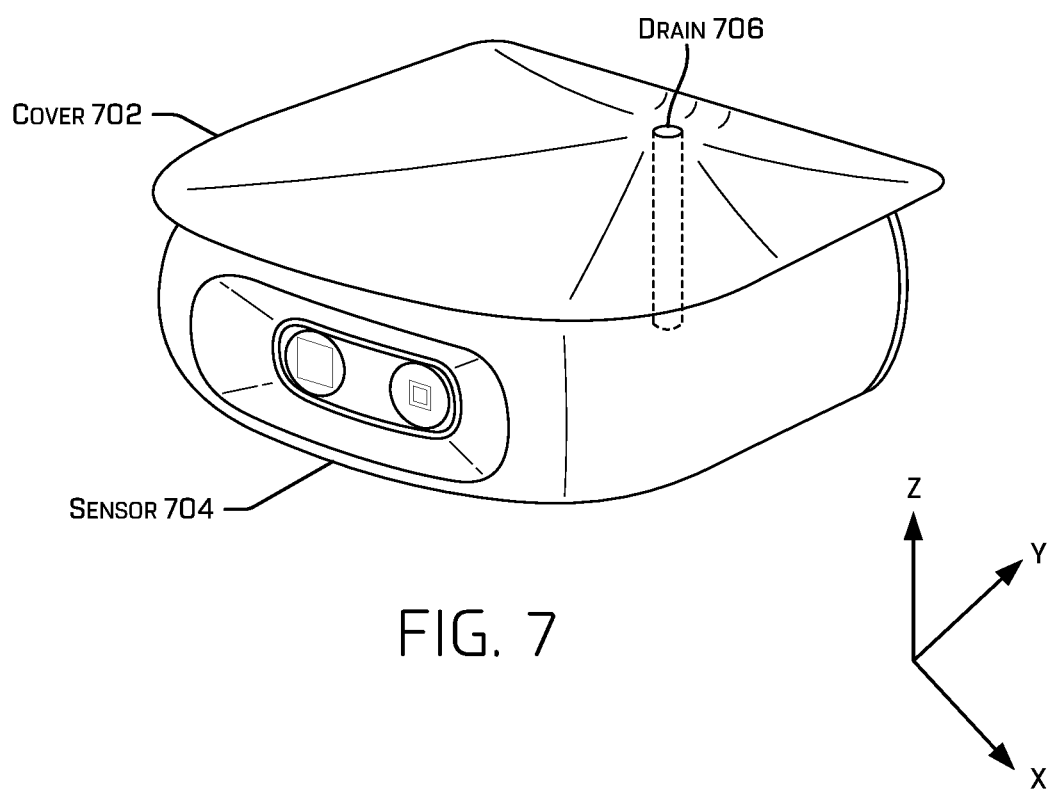
FIG. 7 is a pictorial diagram illustrating an example view of a sensor with an example cover assembly.

FIG. 7 is a pictorial diagram illustrating an example sensor assembly 700 with an example cover assembly. For instance, sensor assembly 700 can include a cover 702 protecting a sensor 704 from an obstruction (e.g., liquid or other debris) by implementing a drain 706. The cover can be configured similar to the cover 102 and/or the cover 602. The sensor 704 can represent a spinning lidar sensor, a solid state lidar sensor, or other sensor type. The drain 706 can be configured to direct, divert, or otherwise relocate the obstruction from the cover 702 to an area away from a side surface of the sensor 704.

As shown in FIG. 7, the cover 702 includes a concave surface to direct the obstruction toward the drain 706. In some examples, the cover 702 can include a brim that overhangs an edge of a top surface of the sensor 704 to capture one or more obstructions that may otherwise obstruct a side surface of the sensor 704 (e.g., a perimeter of the cover 702 is greater than a perimeter of the sensor 704).

In various examples, the sensor 704 can include a housing (not shown) that houses components of the sensor 704. In some examples, the drain 706 can be configured to extend through an interior portion of the housing of the sensor 704. For instance, the drain 706 can represent an opening in the cover 702 and extends to a back side or back edge of the housing (e.g., a side away from a portion of the sensor 704 used to detect an environment).

In some examples, the sensor 704 can be coupled to a vehicle (e.g., the autonomous vehicle 502) and the drain 706 can be positioned away from a portion of the sensor 704 used for sensing the environment. In some examples, the drain 706 can be offset from a center of the sensor 704 and can be located on or near an exterior of the sensor 704. In various examples, the drain 706 can represent a hollow tube that extend towards a bottom surface of the sensor 704.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples described herein.

A: A vehicle comprising: a sensor assembly including a sensor configured to sense an environment of the vehicle; a cover coupled to a top surface of the sensor assembly; and a trough configured to divert a liquid from the cover toward a side of the sensor assembly proximate a body of the vehicle.

B: The vehicle of paragraph A, wherein the cover comprises a perimeter that extends beyond the side of the sensor assembly.

C: The vehicle of paragraph A or B, wherein a top surface of the cover comprises a slope from a first region associated with a first field of view to a second region associated with a second field of view different from the first field of view.

D: The vehicle of paragraph C, wherein the second field of view is disposed between an emitter of the sensor and the body of the vehicle.

E: A sensor cover assembly comprising: a lidar sensor configured to detect an object in an environment, the lidar sensor comprising: a housing having a top surface and a side surface; and a cover coupled to the top surface of the housing of the lidar sensor and extending beyond at least a portion of the side surface of the housing, the cover comprising: a top surface portion configured to direct a liquid from a first region of the cover associated with a first field of view of the lidar sensor to a second region of the cover associated with a second field of view of the lidar sensor different from the first field of view; and a channel portion configured to receive the liquid from the top surface portion of the cover and direct the liquid to an opening in the second region.

F: The sensor cover assembly of paragraph E, wherein: the lidar sensor is coupled a vehicle, and the second region of the cover associated with the second field of view is disposed between an emitter of the lidar sensor and a body of the vehicle.

G: The sensor cover assembly of paragraph E or F, further comprising: an enclosure housing at least a portion of the lidar sensor and at least a portion of an additional sensor, and a tube that extends from the opening in the second region of the cover through at least a portion of the enclosure.

H: The sensor cover assembly of any of paragraphs E-G, wherein: the top surface portion of the cover comprises a sloped surface or a curved surface configured to direct the liquid toward the opening.

I: The sensor cover assembly of any of paragraphs E-H, wherein the channel portion slopes downwardly from a direction pointing from a center of the top surface portion towards at least a perimeter of the lidar sensor.

J: The sensor cover assembly of any of paragraphs E-I, wherein the channel portion is a first channel, and further comprising: a second channel encompassing at least a portion of a perimeter of the top surface portion of the cover, the second channel configured to direct the liquid to the first channel.

K: The sensor cover assembly of any of paragraphs E-J, wherein the channel portion extends to at least the portion of the side surface of the housing.

L: The sensor cover assembly of any of paragraphs E-K, wherein the cover is spaced a distance above the top surface of the housing and a bottom surface of the cover.

M: The sensor cover assembly of any of paragraphs E-L, wherein the channel portion is a first channel, and further comprising: a second channel coupled to the opening, the second channel configured to direct the liquid from the first channel away from a portion of the side surface of the housing.

N: The sensor cover assembly of paragraph M, wherein the second channel is an enclosed tube that extends from the opening in the second region to a bottom of the side surface of the housing.

O: The sensor cover assembly of any of paragraphs E-N, further comprising: a manipulator coupled to the cover and configured to move the cover relative to the housing.

P: The sensor cover assembly of any of paragraphs E-O, wherein the cover comprises a crumple zone configured to plastically deform upon impact with an object in the environment.

Q: A cover for protecting a sensor from an obstruction, the cover comprising: a first surface configured to be coupled to a top surface of a housing surrounding a portion of the sensor; a second surface that extends to at least a portion of a side surface of the housing; a first region associated with a first field of view of the sensor and a second region associated with a second field of view of the sensor different from the first field of view; a channel portion configured to receive the obstruction from the first region and divert the obstruction to the second region; and wherein the cover defines an opening configured to direct the obstruction away from the first region associated with the first field of view.

R: The cover of paragraph Q, wherein: the cover is circular and includes a brim that extends beyond a side surface of the housing.

S: The cover of paragraph R, wherein: the brim is concave away from the top surface.

T: The cover of any of paragraphs Q-S, wherein: the first surface of the cover is a top surface having a negative slope from a first point of the first region to a second point of the second region, and the first field of view is greater than the second field of view.

U: A vehicle comprising: a sensor configured to sense an environment of the vehicle, the sensor comprising a generally cylindrical lens; a cover coupled to a top surface of the sensor configured to divert a liquid from the cover toward a radial center of the generally cylindrical lens; and a drain configured to receive the liquid diverted by the cover and to exhaust the liquid through an area defined interiorly to the generally cylindrical lens of the sensor.

V: The vehicle of paragraph U, wherein the drain comprises a first end adjacent the cover and a second end disposed on an opposite side of the sensor.

W: The vehicle of paragraph U or V, wherein the cover comprises a perimeter that extends beyond the generally cylindrical lens.

X: The vehicle of any of paragraphs U-W, wherein: the sensor is a mechanical spinning lidar sensor, and the drain is further configured to transmit the liquid through a central shaft of the mechanical spinning lidar sensor.

Y: The vehicle of any of paragraphs U-X, further comprising a heater to provide thermal energy to an area of the drain.

Z: The vehicle of any of paragraphs U-Y, further comprising a screen to protect debris of a given size from entering the drain.

AA: A sensor cover assembly comprising: a sensor configured to detect an object in an environment, the sensor comprising a housing having a top surface and a side surface; and a cover coupled to the top surface of the housing and configured to divert a liquid from the cover toward the housing, the cover comprising: a drain configured to receive the liquid diverted by the cover and to direct the liquid through an interior portion of the housing of the sensor.

AB: The sensor cover assembly of paragraph AA, wherein: the sensor is coupled a vehicle, and the drain comprises a first end adjacent the cover and a second end disposed on an opposite side of the housing of the sensor to the first end.

AC: The sensor cover assembly of paragraph AA or AB, further comprising: an enclosure housing at least a portion of the sensor and at least a portion of an additional sensor, and a tube that extends from the drain of the cover through at least a portion of the enclosure to a drain outlet.

AD: The sensor cover assembly of any of paragraphs AA-AC, wherein: the cover comprises a sloped surface or a curved surface configured to direct the liquid toward the drain.

AE: The sensor cover assembly of any of paragraphs AA-AD, wherein the drain is a hollow tube.

AF: The sensor cover assembly of any of paragraphs AA-AE, wherein: the sensor is a mechanical spinning lidar sensor, and the drain is further configured to transmit the liquid through a central shaft of the mechanical spinning lidar sensor.

AG: The sensor cover assembly of any of paragraphs AA-AF, wherein the cover extends beyond at least a portion of the side surface of the housing.

AH: The sensor cover assembly of any of paragraphs AA-AG, wherein the drain is further configured to direct the liquid away from a portion of the side surface of the housing.

AI: The sensor cover assembly of any of paragraphs AA-AH, wherein the drain extends from the top surface of the cover to a bottom of the side surface of the housing.

AJ: The sensor cover assembly of any of paragraphs AA-AI, wherein the sensor is a solid state lidar sensor or a mechanical spinning lidar sensor.

AK: The sensor cover assembly of any of paragraphs AA-AJ, wherein the interior portion of the housing of the sensor is a radial center of the sensor.

AL: The sensor cover assembly of any of paragraphs AA-AK, wherein the interior portion of the housing of the sensor is offset from a center of the sensor.

AM: The sensor cover assembly of any of paragraphs AA-AL, wherein the sensor is a first sensor and the cover is further configured to divert the liquid away from a second sensor different from the first sensor.

AN: The sensor cover assembly of any of paragraphs AA-AM, further comprising: an enclosure housing at least a portion of the sensor and at least a portion of an additional sensor, wherein the drain extends from the cover through at least a portion of the enclosure.

While the example clauses described above are described with respect to one particular implementation, it should be understood that, in the context of this document, the content of the example clauses can also be implemented via a method, device, system, computer-readable medium, and/or another implementation.

Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
   a sensor configured to sense an environment of the vehicle, the sensor comprising a generally cylindrical lens;
   a cover coupled to a top surface of the sensor configured to divert a liquid from the cover toward a radial center of the generally cylindrical lens; and
   a drain configured to receive the liquid diverted by the cover and to exhaust the liquid through an area defined interiorly to the generally cylindrical lens of the sensor.

2. The vehicle of claim 1, wherein the drain comprises a first end adjacent the cover and a second end disposed on an opposite side of the sensor.

3. The vehicle of claim 1, wherein the cover comprises a perimeter that extends beyond the generally cylindrical lens.

4. The vehicle of claim 1, wherein:
   the sensor is a mechanical spinning lidar sensor, and
   the drain is further configured to transmit the liquid through a central shaft of the mechanical spinning lidar sensor.

5. The vehicle of claim 1, further comprising a heater to provide thermal energy to an area of the drain.

6. The vehicle of claim 1, further comprising a screen to protect debris of a given size from entering the drain.

7. A sensor cover assembly comprising:
   a sensor configured to detect an object in an environment, the sensor comprising a housing having a top surface and a side surface; and
   a cover coupled to the top surface of the housing and configured to divert a liquid from the cover toward the housing, the cover comprising:
      a drain configured to receive the liquid diverted by the cover and to direct the liquid through an interior portion of the housing of the sensor.

8. The sensor cover assembly of claim 7, wherein:
   the sensor is coupled a vehicle, and
   the drain comprises a first end adjacent the cover and a second end disposed on an opposite side of the housing of the sensor to the first end.

9. The sensor cover assembly of claim 7, further comprising:
   an enclosure housing at least a portion of the sensor and at least a portion of an additional sensor, and
   a tube that extends from the drain of the cover through at least a portion of the enclosure housing to a drain outlet.

10. The sensor cover assembly of claim 7, wherein:
    the cover comprises a sloped surface or a curved surface configured to direct the liquid toward the drain.

11. The sensor cover assembly of claim 7, wherein the drain is a hollow tube.

12. The sensor cover assembly of claim 7, wherein:
    the sensor is a mechanical spinning lidar sensor, and
    the drain is further configured to transmit the liquid through a central shaft of the mechanical spinning lidar sensor.

13. The sensor cover assembly of claim 7, wherein the cover extends beyond at least a portion of the side surface of the housing.

14. The sensor cover assembly of claim 7, wherein the drain is further configured to direct the liquid away from a portion of the side surface of the housing.

15. The sensor cover assembly of claim 7, wherein the drain extends from the top surface of the cover to a bottom of the side surface of the housing.

16. The sensor cover assembly of claim 7, wherein the sensor is a solid state lidar sensor or a mechanical spinning lidar sensor.

17. The sensor cover assembly of claim 7, wherein the interior portion of the housing of the sensor is a radial center of the sensor.

18. The sensor cover assembly of claim 7, wherein the interior portion of the housing of the sensor is offset from a center of the sensor.

19. The sensor cover assembly of claim 7, wherein the sensor is a first sensor and the cover is further configured to divert the liquid away from a second sensor different from the first sensor.

20. The sensor cover assembly of claim 7, further comprising:
    an enclosure housing at least a portion of the sensor and at least a portion of an additional sensor,
    wherein the drain extends from the cover through at least a portion of the enclosure housing.

* * * * *